I. J. WESTAD.
HAY SLING TRIGGER.
APPLICATION FILED MAY 23, 1910.
973,598.
Patented Oct. 25, 1910.
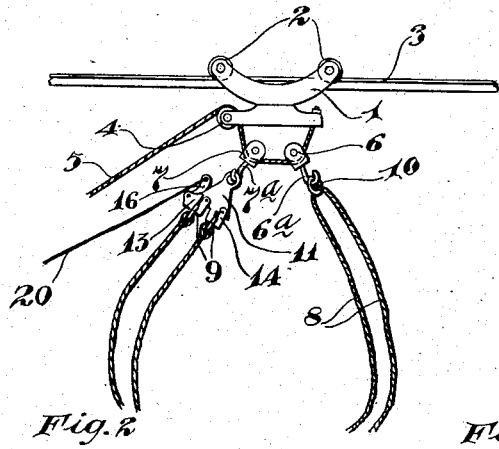
Fig. 1
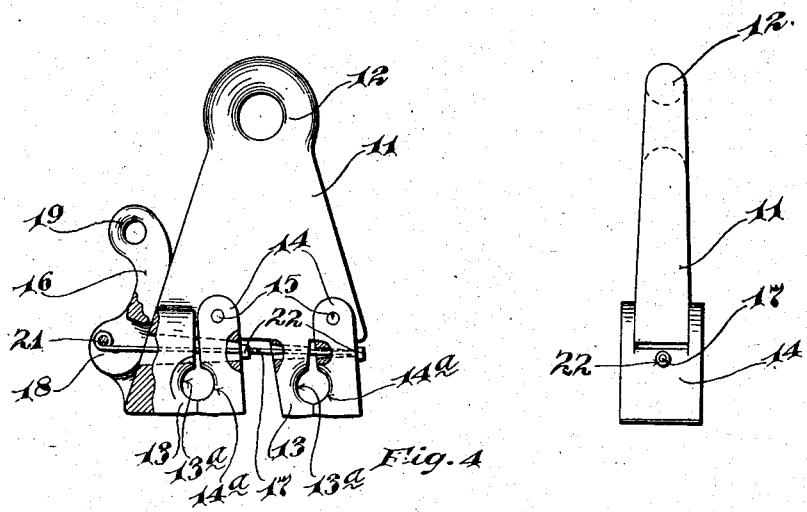
Fig. 2  Fig. 3  Fig. 4
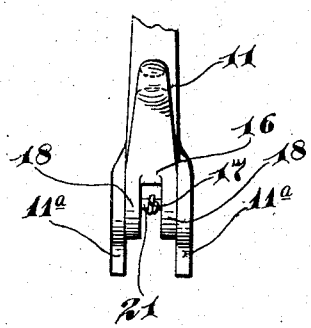
Witnesses:
L. L. Simpson,
Harry Opsahl.
Inventor:
Ivar J. Westad.
By his Attorneys:
Williamson Merchant

UNITED STATES PATENT OFFICE.

IVAR J. WESTAD, OF FLAMING, MINNESOTA.

HAY-SLING TRIGGER.

973,598.  Specification of Letters Patent.  Patented Oct. 25, 1910.

Application filed May 23, 1910. Serial No. 562,855.

*To all whom it may concern:*

Be it known that I, IVAR J. WESTAD, a citizen of the United States, residing at Flaming, in the county of Norman and State of Minnesota, have invented certain new and useful Improvements in Hay-Sling Triggers; and I do hereby declare the following to be a full, clear, and exact description of the invention, such as will enable others skilled in the art to which it appertains to make and use the same.

My invention has for its especial object to provide an improved trigger for hay slings and, to this end, it consists of the novel devices and combinations of devices hereinafter described and defined in the claims.

In the accompanying drawings which illustrate the invention, like characters indicate like parts throughout the several views.

Referring to the drawings, Figure 1 is a view in side elevation, showing the improved trigger applied in working position on a hay sling; Fig. 2 is a view in side elevation of the improved trigger, on an enlarged scale, with some parts broken away; Fig. 3 is a view in rear edge elevation of the same; and Fig. 4 is a view in front edge elevation of the same, with some parts broken away.

The hay sling carrier shown in the accompanying drawings, and to which my improved trigger is applied, is illustrated in diagram only, and for the purpose of this case may be of the standard or any suitable construction.

The numeral 1 indicates the hay sling carrier frame having journaled in its upper portion a pair of laterally spaced track engaging wheels 2, which, in turn, are mounted to run upon an elevated track, a portion of which is illustrated by the numeral 3. This elevated track 3 may be supported by any suitable means, not shown. In the lower portion of the carrier frame 1 is journaled a guide sheave 4, over which sheave a draft rope 5 is arranged to run. One end of this rope 5 is secured to the carrier frame 1 and, to its other end, draft animals may be attached for the purpose of hoisting the hay sling and moving the hay sling carrier along the track 3. Between the guide sheave 4 and the end of the rope attached to the carrier frame 1 a pair of tackle blocks 6 and 7 are mounted on the rope 5, and to each of these tackle blocks 6 and 7 is rigidly secured depending hooks $6^a$ and $7^a$, respectively. The hay sling is, as shown, preferably in the form of a rope 8 which is provided at each end with a ring 9 and, at its intermediate portion, with a third ring 10. This ring 10 is adapted to be attached to the tackle block 6 by means of its hook $6^a$ and holds the two ends of the sling 8 in parallel arrangement, and the rings 9, at the free ends of the sling 8, are adapted to be held by the improved hay sling trigger.

Referring to my improved hay sling trigger, the numeral 11 indicates the head which terminates at its upper end in an eye 12 adapted to be connected to the tackle block 7 by means of its depending hook $7^a$. The trigger head 11 is provided, at its lower edge, with a pair of depending grapples adapted to receive and hold the rings 9 of the sling 8. Each of these grapples comprises a relatively fixed member 13, integrally formed on the trigger head 11, and a movable member 14 bifurcated at its upper end and the prongs thereof being pivotally attached to the trigger head 11 by means of a pin 15. Both members 13 and 14 of the grapples are provided, on their inner vertical edges, with coöperating half seats $13^a$ and $14^a$, respectively, and said seats are adapted to receive and hold the rings 9 of the sling 8.

The movable members 14 of the grapples are connected to a releasing lever 16, preferably, by means of a light rod 17, or, if desired, a wire or small cable may be used. The releasing lever 16 is provided at one end with a bifurcated cam head 18 and at its other end with an eye 19, to which eye is secured one end of a releasing rope 20. The cam head 18 is preferably loosely mounted between a pair of laterally spaced guide lugs $11^a$ integrally formed with and projecting from the front edge of the trigger head 11. When the lever 16 is loosely mounted, as shown in Fig. 2, the adjacent edge of the trigger head 11 acts as a base of reaction for the cam head 18. One end of the rod 17 works between the prongs of the cam head 18 and is pivotally connected thereto by means of a short pin 21 secured to and connecting the two prongs of the cam head 18. The pin 21 is eccentrically located with respect to the axis of the cam head 18, as best shown in Fig. 2, and the rod 17 is provided with a pair of collars 22 which engage the movable members 14 of the grapples, and when the lever 16 is turned into the position indicated in Fig. 2, hold said movable members 14 in close engagement with the relatively fixed members 13. By reference to Fig. 2, it will be noted that the rod 17 is passed through elongated seats formed in all members of the grapples and that when the grapples are closed by the rod 17 and cam head 18, the pin 21 will be on a dead center and thereby securely holding the lever 16 in its operative position. As is evident, by drawing on the releasing rope 20, the lever 16 will be moved into an inoperative position, thereby moving the collars 22 out of engagement with the members 14 of the grapples and the weight of the load held by the sling 8 will open the movable members 14 of the grapple and thereby release the load.

The above described device, while extremely simple and of small cost to make, is thought to be highly efficient for the purpose had in view.

What I claim is:

1. The combination with a carrier having means for holding the looped end of a rope, of a head secured to said carrier and provided with a pair of independent grapples and each thereof comprising coöperating rope engaging members, and means carried by said head for holding said grapples locked and for releasing the same, substantially as described.

2. The combination with a carrier having means for holding the looped end of a rope, of a head secured to said carrier and provided with a pair of grapples comprising relatively fixed and coöperating movable members for holding two ends of said rope, a lever mounted on said head, and a connection from said lever to the movable members of said grapples for holding said movable members in operative positions and for simultaneously releasing the same, substantially as described.

3. The combination with a carrier having means for holding the looped end of a rope, of a head secured to said carrier and provided with a pair of grapples comprising relatively fixed and coöperating movable members for holding two ends of said rope, a cam lever loosely mounted between laterally projecting lugs on said head, and a connection from said cam lever to the movable members of said grapples for holding said movable members in operative positions and for simultaneously releasing the same, substantially as described.

In testimony whereof I affix my signature in presence of two witnesses.

IVAR J. WESTAD.

Witnesses:
D. C. JONES,
N. B. BAGUE.